United States Patent [19]

McDonald

[11] Patent Number: 4,662,207
[45] Date of Patent: May 5, 1987

[54] HYDRAULICALLY OPERATED METAL WORKING TOOL

[75] Inventor: Douglas A. McDonald, Mount Colah, Australia

[73] Assignee: Liras Pty. Limited, North Sydney, Australia

[21] Appl. No.: 808,933

[22] Filed: Dec. 13, 1985

[30] Foreign Application Priority Data

Dec. 20, 1984 [AU] Australia .............................. PG8654

[51] Int. Cl.⁴ .............................. B26D 1/00; B21J 7/28
[52] U.S. Cl. .................................... 72/453.07; 72/456; 72/472; 72/453.01; 83/197; 83/198; 83/618; 83/639; 92/117 A
[58] Field of Search ........... 72/453.01, 453.02, 453.05, 72/453.07, 455, 456, 472, 389; 83/639, 618, 620, 197, 198; 92/75, 117 R, 117 A, 167

[56] References Cited

U.S. PATENT DOCUMENTS

| | | | |
|---|---|---|---|
| 2,710,137 | 12/1950 | Arnouil | 230/172 |
| 2,792,790 | 5/1957 | Capps | 103/178 |
| 2,956,845 | 10/1960 | Wahlmark | 309/4 |
| 3,168,013 | 2/1965 | Williamson | 92/117 R |
| 3,181,779 | 5/1965 | Rhodes | 230/172 |
| 3,241,350 | 3/1966 | Giordano | 72/455 |
| 3,271,991 | 9/1966 | Monahan | 72/453 |
| 3,403,602 | 10/1968 | Brandon | 92/61 |
| 3,490,344 | 1/1970 | Archer et al. | 92/75 |
| 3,716,310 | 2/1973 | Guenther | 417/552 |
| 3,822,579 | 7/1974 | Kononenko | 72/407 |
| 3,877,349 | 4/1975 | Schindel | 92/75 |
| 4,030,389 | 6/1977 | Ponomarenko | 83/513 |
| 4,246,833 | 1/1981 | Burklund | 92/153 |
| 4,442,694 | 4/1984 | Fuesser | 72/453.01 |
| 4,457,197 | 7/1984 | Wepner | 83/620 |
| 4,558,582 | 12/1985 | Mernig | 72/456 |
| 4,580,434 | 4/1986 | Graf | 72/389 |

Primary Examiner—Robert L. Spruill
Assistant Examiner—David B. Jones
Attorney, Agent, or Firm—Limbach, Limbach & Sutton

[57] ABSTRACT

This specification discloses a compact press tool which is capable of accommodating eccentric loadings without jamming or causing hydraulic fluid leakage.

Specifically the press tool (1) comprises: a stationary element (2), a movable element (3) and an hydraulic ram (5) adapted to translate the movable element (3) relative to the stationary element (2). The hydraulic ram (5) has a first piston (7) fixedly connected with the stationary element (2), a second piston (9), axially spaced from the first piston (7), able to bear against the movable element (3), and a floating cylinder (10) sealed at one end by the first piston and at the other end by the second piston (9).

11 Claims, 6 Drawing Figures

4,662,207

HYDRAULICALLY OPERATED METAL WORKING TOOL

BACKGROUND OF THE INVENTION

1. Field of the Invention

The present invention relates to press tools and specifically to hydraulically operated press tools used for metal working.

2. Description of the Prior Art

Known hydraulically operated press tools generally comprise a rigid structure having a work table and a head disposed above the work table. An hydraulically movable element is provided for translation between the head and the work table along substantial guide rails.

When the press tool is used, for example, in a punching operation, a punch is fixed to the movable element and a matching die to the work table. When the press tool is actuated, an hydraulic ram urges the moving element and its attached punch downwardly to pierce a work piece held above the die.

Due to the guide rail arrangement such press tools are unsuitable for performing a metal working operation at a position removed from the longitudinal axis of the hydraulic ram. For example, in a punching, slotting or cutting operation at a location adjacent an edge of the work table, the eccentric nature of the loads imposed on the press tool may cause the hydraulic ram to leak or the movable element to jam relative to the guide rails.

Furthermore, the above described arrangements generally extend a considerable distance from the work table. This makes them awkward to manufacture, transport and house.

It is an object of the present invention to provide an improved press tool.

SUMMARY OF THE INVENTION

The present invention consists in a press tool comprising:
- a stationary element;
- a movable element; and
- an hydraulic ram adapted to translate said movable element relative to said stationary element in a working stroke;
- said hydraulic ram having a first piston fixedly connected with one of said elements, a second piston, axially spaced from said first piston, able to bear against the other of said elements, and a floating cylinder sealed at one end by said first piston and at the other end by said second piston.

BRIEF DESCRIPTION OF THE DRAWINGS

A preferred embodiment of the present invention will now be described by way of example only with reference to the accompanying drawings in which.

DESCRIPTION OF THE PREFERRED EMBODIMENT

Figure 1:
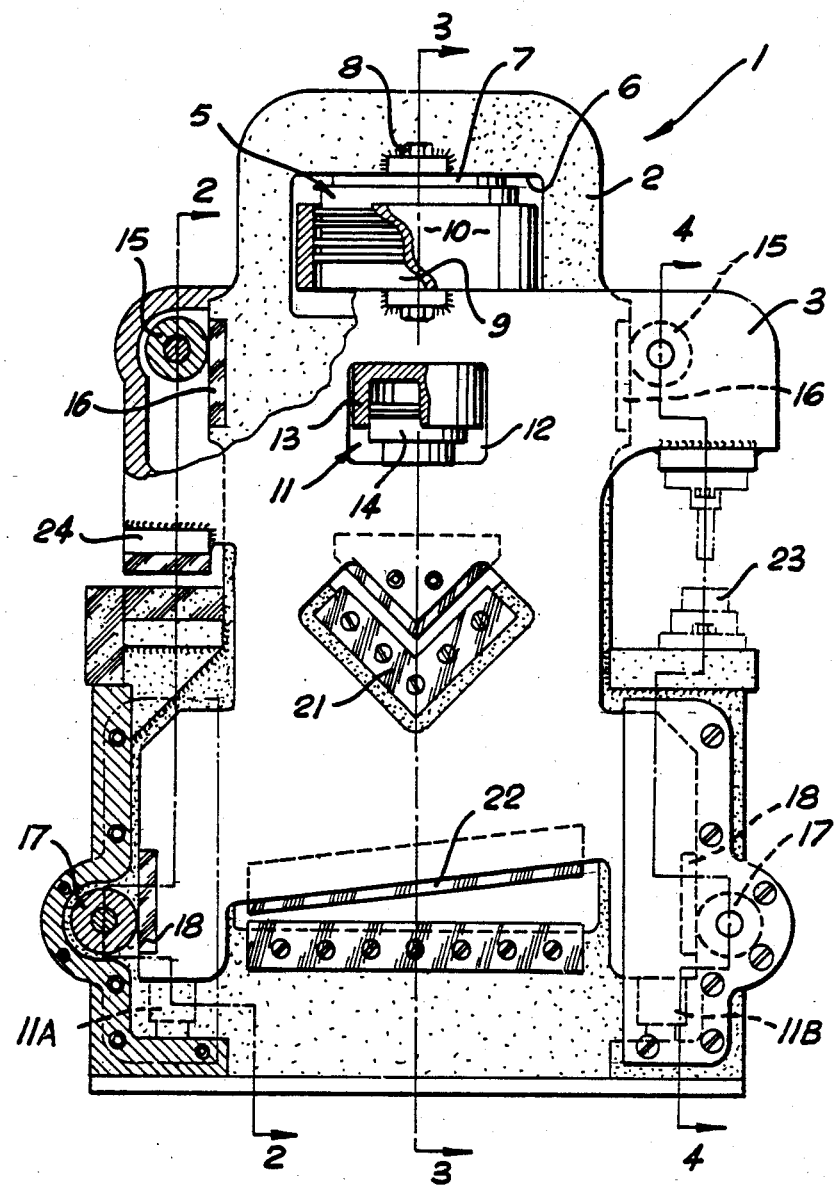
FIG. 1 is a partly sectioned end elevation of a press tool according to the present invention.

Referring to the drawings, the press tool 1 comprises a stationary element 2 and a movable element 3. These elements are plate like and are disposed in upstanding spaced apart relationship.

An hydraulic ram 5 is housed within a window 6 formed in the stationary element 2. The hydraulic ram 5 includes a first piston 7 which is fixedly attached to the stationary element 2 by bolts 8. A second piston 9 bears against movable element 3, and a floating cylinder 10 is sealed at a top end by piston 7 and at a bottom end by the piston 9. The second piston 9 may be fixedly attached to the moveable element 3 as shown but this is not necessary.

A return hydraulic ram 11 is preferably located within a second window 12 which extends through the stationary element 2 and the movable element 3. The return hydraulic ram 11 comprises a cylinder 13 which is connected with the stationary element 2, and a telescopic piston arrangement 14 which is able to bear against the movable element 3. This telescopic arrangement provides a reduced total height of the window 12. Clearly, a single stage piston can be used if the required strength of the material above and below the window provides sufficient space for a deeper window.

Figures 2, 3, 4:
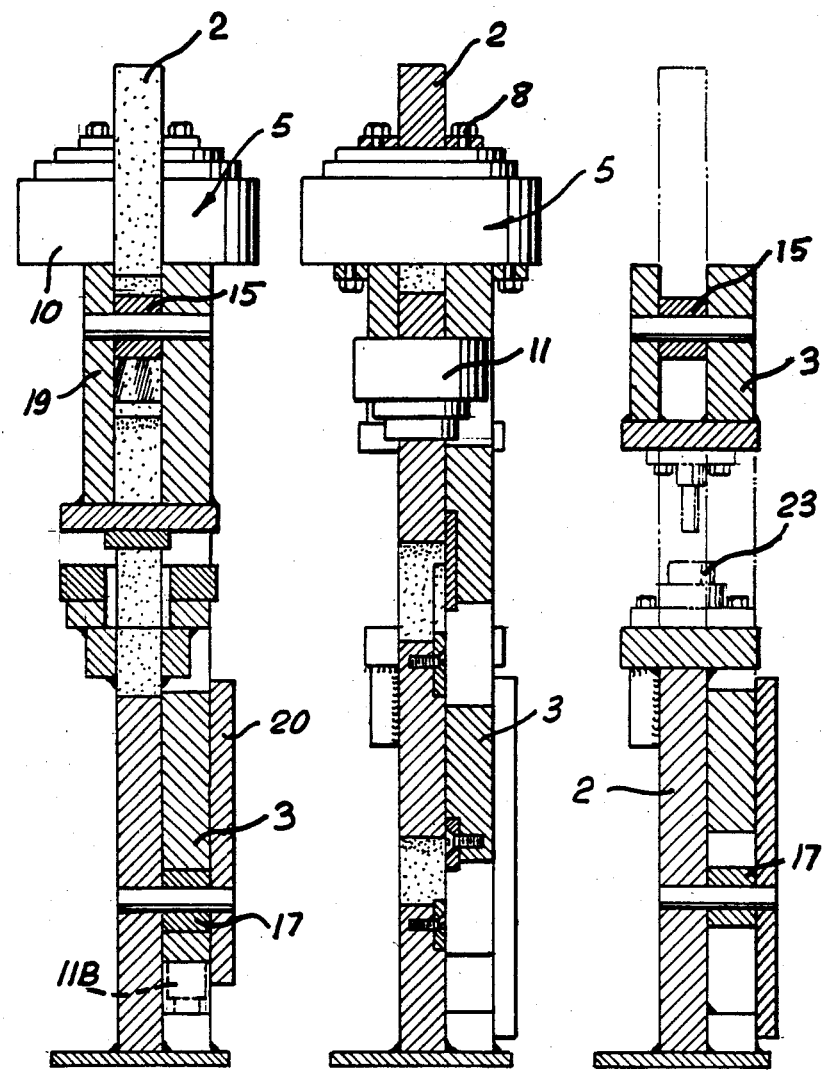
FIG. 2 is a partly sectioned side elevation taken on line 2—2 of FIG. 1.
FIG. 3 is a partly sectioned side elevation taken on line 3—3 of FIG. 1.
FIG. 4 is a partly sectioned side elevation taken on line 4—4 of FIG. 1.
Figure 5:
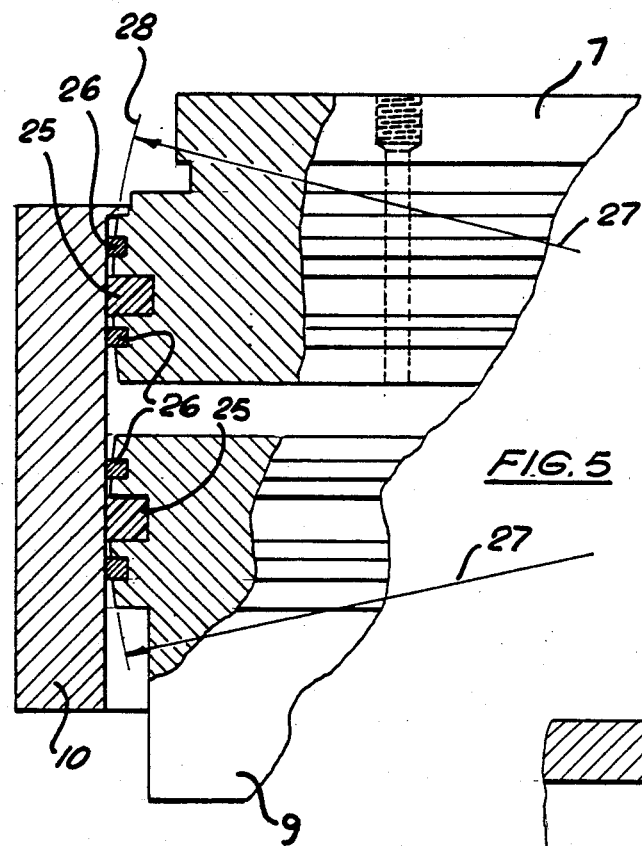
FIG. 5 is an enlarged fragmentary sectional view of an hydraulic ram forming part of the illustrated press tool.
Figure 6:
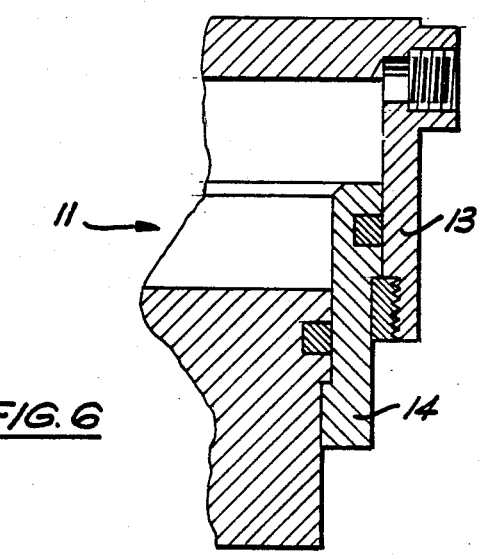
FIG. 6 is an enlarged fragmentary sectional view of a return ram forming part of the illustrated press tool.

In another embodiment, the single return ram may be replaced by a pair of hydraulic rams, each located beneath the movable element 3 as shown by the dotted lines indicated at 11A and 11B in FIGS. 1 and 2.

It will be appreciated that any suitable alternate means may be used to return the moveable element 3 to the top of its stroke, such as a return spring, or if the press tool is inverted gravity may effect its return.

A first pair of opposed rolling elements 15 is mounted for rotation to the movable element 3 on respective axles to bear against a pair of opposite surfaces 16 of the stationary element 2. A second pair of opposed rolling elements 17 is mounted for rotation to the stationary element 2 on further respective axles to bear against opposite surfaces 18 of the movable element 3.

The first pair of opposed rollers 15 and the second pair of opposed rollers 17 together with their respective surfaces act to maintain the tracking alignment of the movable element 3 with respect to the stationary element 2. Lateral displacement of the stationary element 2 with respect to the movable element 3 is prevented by the provision of retainer plates 19 and 20.

The illustrated press tool 1 includes four separate working devices including Vee-guillotine 21, sheet guillotine 22, punch 23 and slotting tool 24. In each case a first portion of the device is attached to the movable element 3 and a second portion is attached to stationary element 2. It will be appreciated that various adaptations of the four devices shown may be fitted to the press tool.

In operation, hydraulic fluid is pumped into the hydraulic ram 5 between the first piston 7 and the second piston 9. The effect of hydraulic pressure urges the pistons apart and thereby causes the movable element 3 to move with respect to the stationary element 2. The rolling elements 15, 17, their respective surfaces 16, 18, together with retainer plates 19 and 20 ensure that the relative motion is restrained to be in a direction whereby the respective portions of the working devices 21, 22, 23 and 24 are able to operatively interact. Once the hydraulic ram 5 is expanded to capacity, engaging the respective portions of each of the devices, the return ram 11 is actuated to return the movable element 3 to its original position in readiness for a second operation.

It will be appreciated by those skilled in the art that, when utilising the devices 23 and 24 which are disposed at a location removed from the centre line of action of the hydraulic ram 5, eccentric loads are imposed upon the machine tool. These eccentric loads have the effect of causing the line of action of the hydraulic ram 5 to become distorted notwithstanding the provision of the rolling elements and retainer plates. In order to prevent the hydraulic ram from becoming jammed or developing hydraulic fluid leaks, the floating cylinder 10 is able to move to maintain a seal between the first piston 7 and the second piston 9. Additionally, the peripheral edges of the pistons are relieved as is indicated by radius 27 defining arcs 28. The pistons are preferably spherical in shape but other shapes (such as a stepped construction) will also provide the necessary degree of edge freedom. The pistons are provided with a central seal 25 and a pair of guides 26 disposed one at either side of seal 25.

It will be appreciated by those skilled in the art that a press tool as described above does not require fine tolerances in manufacture because the alignment of the stationary element 2 to the movable element 3 is not critical due to the provision of the specially adapted hydraulic ram 5. Additionally the height of the press tool is reduced in comparison with that of conventional press tools by the provision of hydraulic ram 5 and return ram 11 each located in their respective windows.

Wear, which is a considerable problem in conventional press tools, is substantially reduced in a press tool according to the invention, since when wear occurs, adjustment of surfaces 16 and 18 can overcome any slope caused by that wear.

I claim:

1. A press tool comprising:
   a stationary element;
   a movable element that is disposed in upstanding spaced-apart relationship with said stationary element; and
   an hydraulic ram positioned between said stationary element and said movable element for translating said movable element relative to said stationary element in a press stroke,
   wherein said hydraulic ram has a first piston fixedly connected to one of said stationary element and said movable element, a second piston axially spaced from said first piston for bearing against the other of said stationary element and said movable element, and a floating cylinder sealed at one end by said first piston and at the other end by said second piston, and furtherwherein said first and second pistons are relieved at their edges to prevent them from becoming jammed against said floating cylinder.

2. A press tool according to claim 1 including at least one return ram including a cylinder which is connected with one of said stationary or said moveable elements and a piston which bears against the other.

3. A press tool according to claim 2 wherein said elements are plate-like and said hydraulic ram is disposed in a window in said stationary element.

4. A press tool according to claim 3 wherein said first and second pistons each include a central seal and a pair of guides disposed one on either side of said seal.

5. A press tool according to claim 4 wherein at least two pairs of opposed rolling elements are provided, each rolling element being mounted for rotation about an axle connected with one of said elements to bear against a respective surface of the other element, to thereby constrain the translation of said moveable element relative to said stationary element.

6. A press tool according to claim 5 wherein said piston of said return ram is telescopic.

7. A press tool according to claim 1 wherein said elements are plate-like and wherein at least two pairs of opposed rolling elements are provided, each rolling element being mounted for rotation about an axle connected with one of said elements to bear against a respective surface of the other element, to thereby constrain the translation of said moveable element relative to said stationary element.

8. A press tool according to claim 1 wherein said hydraulic ram is disposed in a window in said stationary element.

9. A press tool according to claim 8 wherein said elements are plate-like.

10. A press tool according to claim 1 wherein said first and second pistons each include a central seal and a pair of guides disposed one on either side of the seal.

11. A press tool according to claim 2 including a pair of return rams each located beneath said moving element.

* * * * *